US010043031B2

(12) United States Patent
Sahter et al.

(10) Patent No.: US 10,043,031 B2
(45) Date of Patent: Aug. 7, 2018

(54) SECURE MANAGEMENT OF USER ADDRESSES IN NETWORK SERVICE

(71) Applicant: eBay Inc., San Jose, CA (US)

(72) Inventors: Snezana Sahter, San Jose, CA (US); Arumugam Alwarappan, San Jose, CA (US); Mahendar Madhavan, Santa Clara, CA (US); Mallikarjuna Potta, San Jose, CA (US)

(73) Assignee: eBay Inc., San Jose, CA (US)

(*) Notice: Subject to any disclaimer, the term of this patent is extended or adjusted under 35 U.S.C. 154(b) by 47 days.

(21) Appl. No.: 15/345,808

(22) Filed: Nov. 8, 2016

(65) Prior Publication Data

US 2018/0129820 A1 May 10, 2018

(51) Int. Cl.
*H04L 29/06* (2006.01)
*G06F 21/62* (2013.01)

(52) U.S. Cl.
CPC ...... *G06F 21/6227* (2013.01); *H04L 63/0209* (2013.01); *H04L 63/102* (2013.01)

(58) Field of Classification Search
CPC ............ G06F 21/6227; H04L 63/0209; H04L 63/102
USPC ............................................................ 726/11
See application file for complete search history.

(56) References Cited

U.S. PATENT DOCUMENTS

| 6,480,850 | B1 | 11/2002 | Veldhuisen |
| 8,843,442 | B2* | 9/2014 | Tennant ............ G06F 17/30893 707/627 |
| 2008/0155274 | A1* | 6/2008 | Martinez ............. G06F 12/1483 713/190 |
| 2009/0070733 | A1* | 3/2009 | Huang .................. G06F 11/366 717/101 |
| 2009/0089861 | A1* | 4/2009 | Catalano ................. G06F 21/85 726/3 |
| 2013/0226929 | A1 | 8/2013 | Yeerelly et al. |
| 2013/0305342 | A1* | 11/2013 | Kottilingal ............. G06F 21/62 726/11 |

(Continued)

OTHER PUBLICATIONS

International Search Report received for PCT Application No. PCT/US2017/060539, dated Feb. 8, 2018, 3 pages.

(Continued)

*Primary Examiner* — Haresh N Patel
(74) *Attorney, Agent, or Firm* — Schwegman Lundberg & Woessner, P.A.

(57) ABSTRACT

Methods, systems, and programs are presented for securing user-address information. A first memory is configured according to a first table that does not include information about user identifiers. Each entry in the first table includes a physical location identifier and information about a physical location. A second memory is configured according to a second table, where each entry in the second table includes the physical location identifier and an account identifier of a user for accessing a service. The first and second tables are configured to separate profile information from the address information of the user. Additionally, a firewall is configured to control access to the second memory. The firewall defines an authentication zone including the second memory but not the first memory, where access to the second memory by internal services is allowed and direct access by the user to the second memory is denied.

20 Claims, 9 Drawing Sheets

(56) References Cited

U.S. PATENT DOCUMENTS

| | | | | |
|---|---|---|---|---|
| 2014/0189373 | A1* | 7/2014 | Gonzalvo | G06F 9/5061 |
| | | | | 713/193 |
| 2015/0294095 | A1* | 10/2015 | Boivie | G06F 21/32 |
| | | | | 726/19 |
| 2015/0332266 | A1* | 11/2015 | Friedlander | G06Q 20/351 |
| | | | | 705/75 |
| 2016/0098220 | A1* | 4/2016 | Rousseau | G06F 12/0246 |
| | | | | 711/103 |

OTHER PUBLICATIONS

International Written Opinion received for PCT Application No. PCT/US2017/060539, dated Feb. 8, 2018, 7 pages.

* cited by examiner

SECURE MANAGEMENT OF USER ADDRESSES IN NETWORK SERVICE

TECHNICAL FIELD

The subject matter disclosed herein generally relates to methods, systems, and programs for managing user information and, more particularly, methods, systems, and computer programs for securing users' address information.

BACKGROUND

It is common for service providers to keep user information in a single table. This table may include the name of the user, login and password, address, credit card information, social connections, etc. However, when a malicious user breaks in through security and gains access to the user table, all the user information is compromised.

The service provider faces user dissatisfaction with the service if the users learn that their information has been stolen and has to take measures to protect themselves. Therefore, it is important for service providers to secure user information and protect users from the misappropriation of data.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
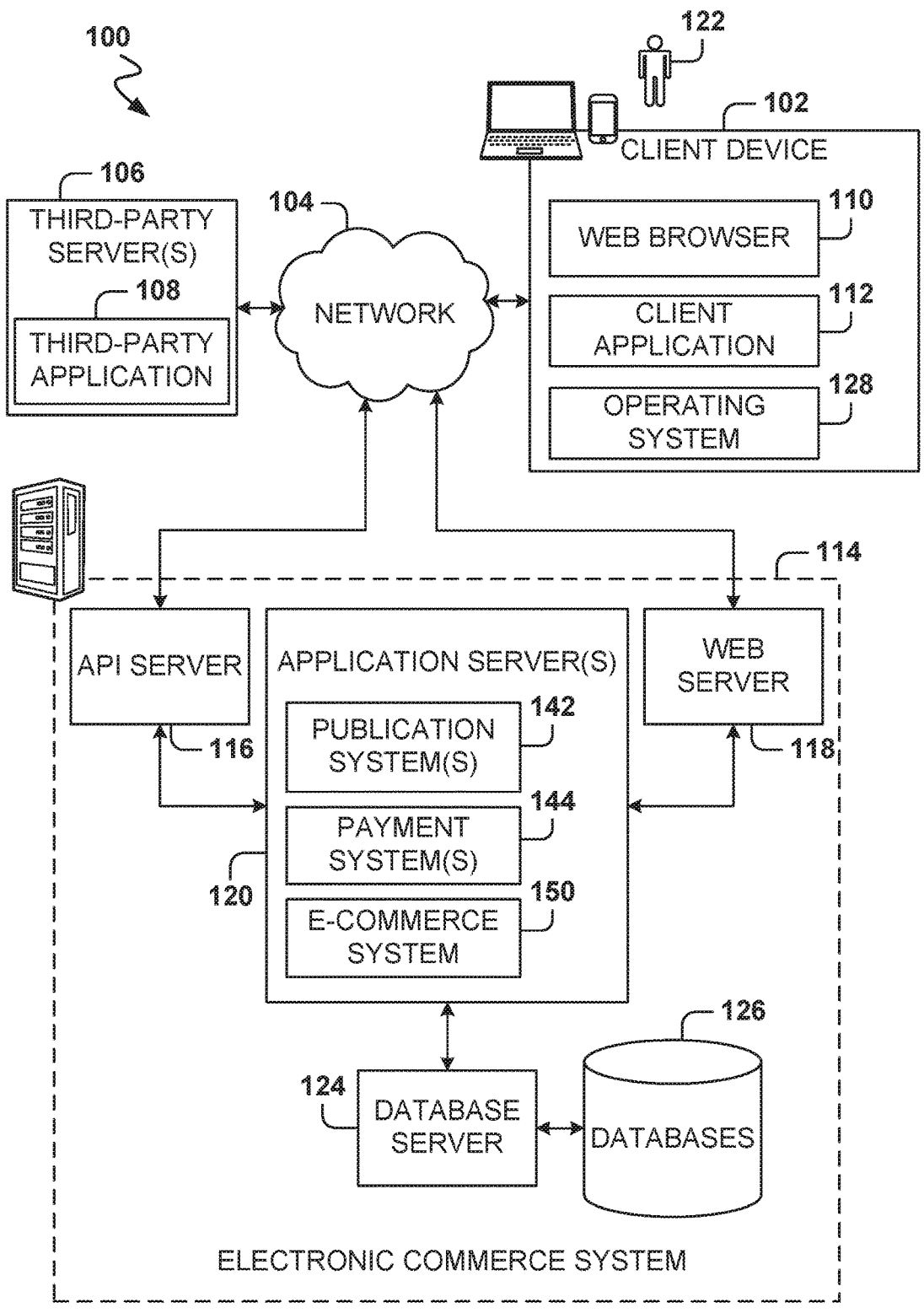
FIG. 1 is a block diagram illustrating a network architecture, according to some example embodiments.

Example methods, systems, and computer programs are directed to securing user-address information. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In order to protect user information, the user information is spread across multiple tables, which may have different levels of security. Personal identifiable information (PII) is information that may be linked to a particular user or group of users. Non-PII is information that is not linked to a particular user, and knowledge of non-PII alone does not compromise user confidential information or user security. For example, having a record with the name of the user and the address of the user is PII because it relays where the user lives. However, a street address, by itself, is not PII because the street address is not linked to a particular user, unless, of course, additional information is obtained to link the user with that address. Besides, street addresses are generally available to anyone by simply checking on a map or a mapping computer tool.

In some example embodiments, PII is placed in a secure zone referred to as the user authentication zone (UAZ), and certain pieces of user information (e.g., addresses, email addresses, and phone numbers) are stored separately from the user's name. These pieces of PII, in isolation, do not need to be as secure because, on their own, these pieces of information are not personal. It is the linkage of this information to the user's name that makes these items PII. The system maintains the PII in the secure UAZ, while other non-PII is kept in a different zone with a less stringent level of security.

Further, service applications, also referred to as service modules or simply services, do not interact directly with the database storing the PII. Instead, the services communicate with a designated service in the UAZ. The designated service (referred to as an address management service (AMS) in one example embodiment) has access to the PII and provides the information to other services when the services are authorized to obtain that information. In addition, in some example embodiments, a firewall controls the access to the UAZ, which includes controlling access by users and other services to the user information.

One general aspect includes a method including an operation for configuring, by one or more processors, a first memory according to a first table, each entry in the first table including a physical location identifier and information about a physical location. The method also includes an operation for configuring, by the one or more processors, a second memory according to a second table, each entry in the second table including the physical location identifier and an account identifier of a user for accessing a network service, the first table and the second table being configured to separate profile information of the user from address information of the user. Further, the method includes an operation for configuring, by the one or more processors, a firewall to control access to the second memory, the firewall defining an authentication zone that includes the second memory and does not include the first memory, the firewall being configured to allow access to the second memory by one or more internal services of the network service and to deny direct access by the user to the second memory.

One general aspect includes a system including a memory including instructions, and one or more computer processors. The instructions, when executed by the one or more computer processors, cause the one or more computer processors to perform operations including configuring a first memory according to a first table, each entry in the first table including a physical location identifier and information about a physical location. The operations further include configuring a second memory according to a second table, each entry in the second table including the physical location identifier and an account identifier of a user for accessing a network service, the first table and the second table being configured to separate profile information of the user from address information of the user. The operations also include configuring a firewall to control access to the second memory, the firewall defining an authentication zone that includes the second memory and does not include the first memory, the firewall being configured to allow access to the second memory by one or more internal services of the network service and to deny direct access by the user to the second memory.

One general aspect includes a non-transitory machine-readable storage medium including instructions that, when executed by a machine, cause the machine to perform operations including configuring, by one or more processors, a first memory according to a first table, each entry in the first table including a physical location identifier and information about a physical location. The operations further include configuring, by the one or more processors, a second memory according to a second table, each entry in the second table including the physical location identifier and an account identifier of a user for accessing a network service, the first table and the second table being configured to separate profile information of the user from address information of the user. The operations also include configuring, by the one or more processors, a firewall to control access to the second memory, the firewall defining an authentication zone that includes the second memory and does not include the first memory, the firewall being configured to allow access to the second memory by one or more internal services of the network service and to deny direct access by the user to the second memory.

FIG. 1 is a block diagram illustrating a network architecture 100, according to some example embodiments. FIG. 1 is an example embodiment of a high-level network architecture 100 of an electronic commerce system 114. The electronic commerce system 114 provides server-side functionality via a network 104 (e.g., the Internet or a wide area network (WAN)) to a client device 102. A web browser 110, a client application 112, and an operating system 128 are hosted and executed on the client device 102. The electronic commerce system 114 includes one or more application servers 120, which host multiple systems, including a publication system 142, a payment system 144, and an e-commerce system 150.

The client application 112 also provides a number of interfaces described herein, which present output of an electronic commerce application for a user 122 of the client device 102. The client device 102 enables the user 122 to access and interact with the electronic commerce system 114. For instance, the user 122 provides input (e.g., touch screen input or alphanumeric input) to the client device 102, and the input is communicated to the electronic commerce system 114 via the network 104. In this instance, the electronic commerce system 114, in response to receiving the input from the user 122, communicates information back to the client device 102 via the network 104 to be presented to the user 122.

An Application Programming Interface (API) server 116 and a web server 118 are coupled to, and provide programmatic and web interfaces respectively to, the application server 120. The application server 120 hosts the e-commerce system 150, which includes components or applications. The application server 120 is, in turn, shown to be coupled to a database server 124 that facilitates access to information storage repositories (e.g., databases 126). In an example embodiment, the databases 126 include storage devices that store information accessed and generated by the electronic commerce system 114.

Additionally, a third-party application 108, executing on a third-party server(s) 106, is shown as having programmatic access to the electronic commerce system 114 via the programmatic interface provided by the API server 116. For example, the third-party application 108, using information retrieved from the electronic commerce system 114, may support one or more features or functions on a website hosted by a third party.

Turning now specifically to the applications hosted by the client device 102, the web browser 110 may access the various systems (e.g., electronic commerce system 114) via the web interface supported by the web server 118. Similarly, the client application 112 (e.g., an "app") accesses the various services and functions provided by the electronic commerce system 114 via the programmatic interface provided by the API server 116. The client application 112 may be, for example, an "app" executing on the client device 102, such as an iOS or an Android OS application, to enable the user 122 to access and input data on the electronic commerce system 114 in an offline manner, and to perform batch-mode communications between the client application 112 and the electronic commerce system 114.

Further, while the network architecture 100 shown in FIG. 1 employs a client-server architecture, the present subject matter is of course not limited to such an architecture, and could equally well find application in a distributed, or peer-to-peer, architecture system, for example. Further, the electronic commerce system 114 could also be implemented as a standalone software program, which does not necessarily have networking capabilities.

Figure 2:
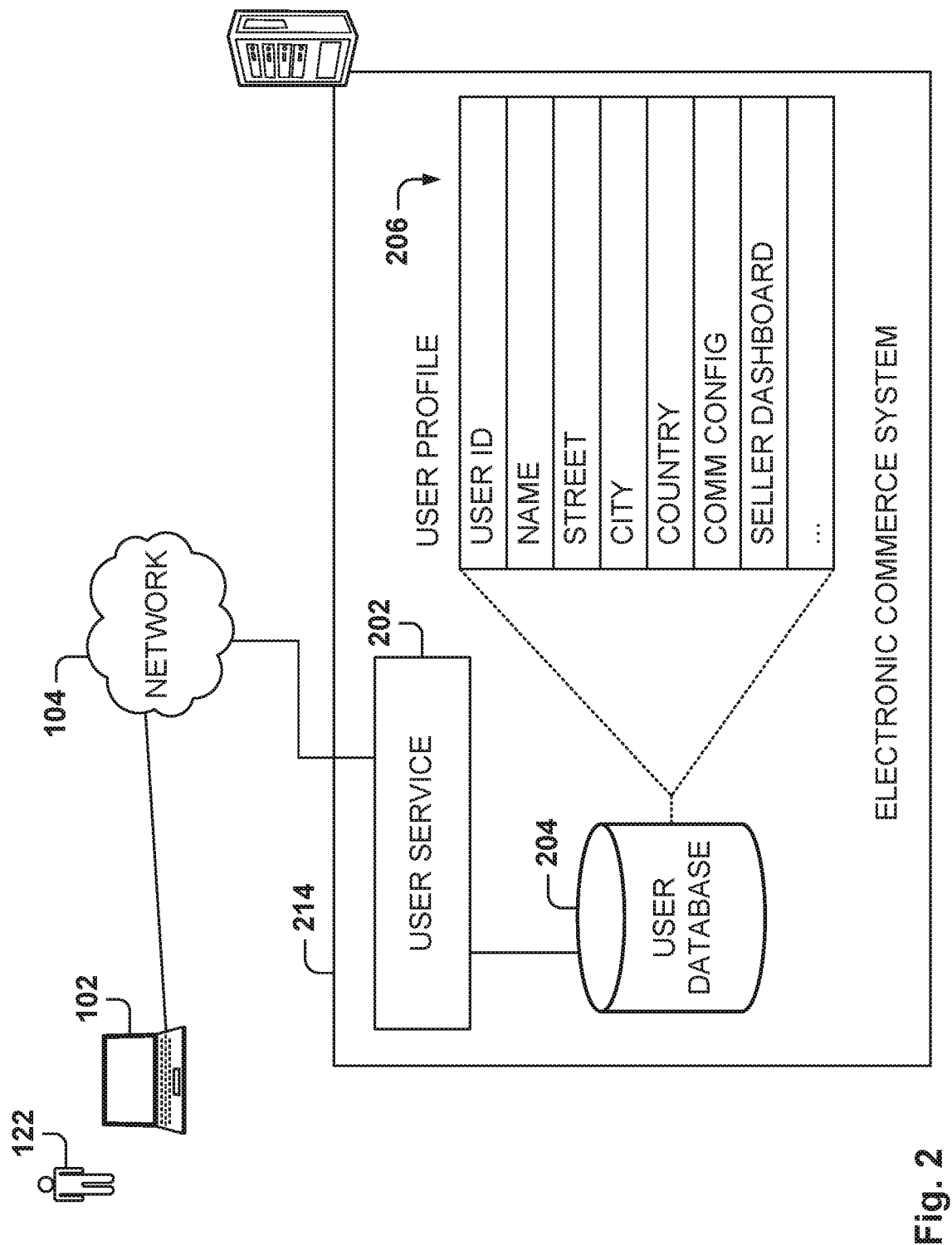
FIG. 2 illustrates a network service that includes a database holding user profile information, according to some example embodiments.

FIG. 2 illustrates a network service that includes a database holding user profile information, according to some example embodiments. An electronic commerce system 214 includes a user service 202 that manages access by the user 122, via the client device 102, to the service offered by the electronic commerce system 214.

The user service 202, also referred to as the orchestrator service, controls access to a user database 204 that holds a user profile table 206. The user profile table 206 is a table that includes information about the user or pointers to information about the user in other tables. In one example embodiment, the user profile table 206 includes one or more of the following: a user identifier (ID), the name of the user, a street address, a city, a country, communication information (e.g., email address, phone number, social network ID), a seller dashboard, a login password, information about one or more credit cards, a billing address, a shopping address, social connections of the user in the electronic commerce system 214, shopping history, selling history, job title, employer identification, information about family members, etc.

Having a single user profile table 206 means that if a malicious user attacks the electronic commerce system 214 and the information on the user profile table 206 is compromised, all the confidential information for the user is compromised.

In addition, there may be a lot of duplication of data within the user profile table 206. For example, several family members may be users of the service and they may all have the same residence address. In addition, many coworkers may use the same delivery address for packages if they use their work address, which will result in many repetitions of the same address in the user profile table 206.

Figure 3:
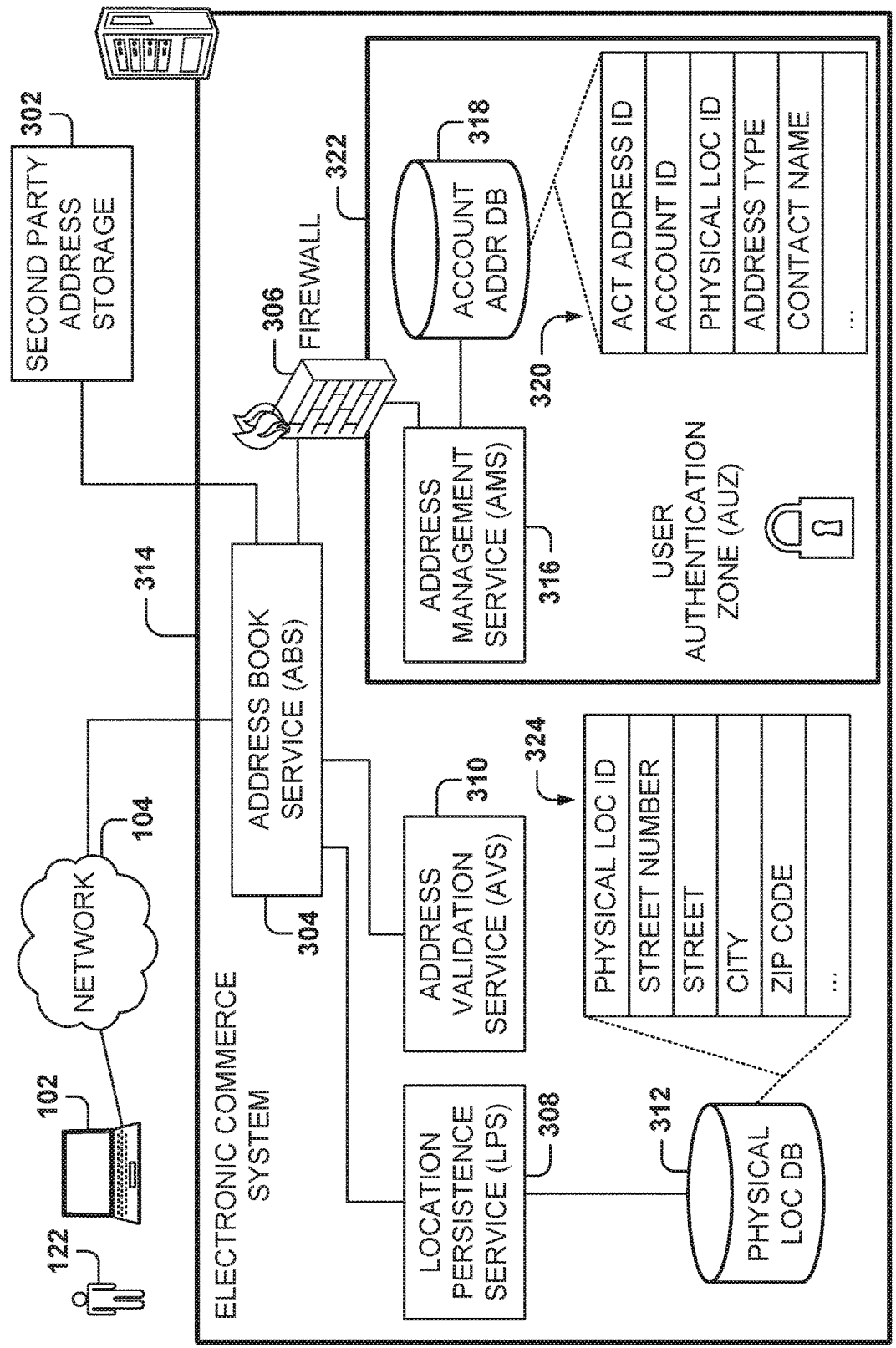
FIG. 3 is a network diagram of a system, according to some example embodiments, for securing user-address information.

FIG. 3 is a network diagram of a system, according to some example embodiments, for securing user-address information. An electronic commerce system 314 includes a plurality of services to manage user information. It is to be noted that some of the embodiments presented herein for protecting user information are described with reference to protecting address information, but the same principles may be applied for other types of information, such as credit card information, bank information, company information, etc. The embodiments illustrated in FIG. 3 should therefore not be interpreted to be exclusive or limiting, but rather illustrative.

The electronic commerce system 314 includes several tables in order to separate PII from non-PII. In particular, the electronic commerce system 314 includes functionality for separating mail addresses from user identifiers, and adding links between the tables to match the users to their addresses. Actual address information (e.g., street number, street, city) is stored separately from the other user information, and a mapping is created between the user and the address information. Besides keeping user information safe, a beneficial side effect is that there are no duplicate addresses in the database.

If a new user is created and the address for that user is already in the address table, then a new reference to the existing address is added for the new user. This way, if many users utilize the same shipping address (e.g., work address) to receive packages, then the same address will not be repeated for each user.

The electronic commerce system 314 includes several services, including an address book service (ABS) 304, an address management service (AMS) 316, a location persistence service (LPS) 308, and an address validation service (AVS) 310. The electronic commerce system 314 further includes a physical location database 312, an account address database 318, and a firewall 306. In addition, in some example embodiments, a second-party address storage 302 may be used to store user addresses.

The ABS 304 exposes end points to be accessible to services inside the electronic commerce system 314, and presents interfaces to the users 122 to store and manage their addresses and their address preferences.

The LPS 308 manages access to the physical location database 312, which stores a physical location table 324. The physical location table 324 stores information about physical locations, which are real mail addresses. Each entry in the physical location table 324 includes a physical location identifier, which is a reference number to the particular entry in the physical location table 324, and information about the physical location, such as street number, street name, city, ZIP code, etc. More information about the physical location table 324 is provided below with reference to FIG. 4.

When the LPS 308 receives a physical location, the LPS 308 checks if the physical location already exists in the physical location table 324. If the physical location is not in the physical location table 324, the LPS 308 creates a new entry in the physical location table 324 with a new physical location identifier. If the physical location is already present in the physical location table 324, the LPS 308 returns the physical location identifier associated with the physical location.

The AVS 310 validates and normalizes addresses. In some example embodiments, the AVS 310 calls third-party services such as AddressDoctor and Pitney Bowes, to normalize and validate the addresses. In some example embodiments, when the ABS 304 receives an address from a user, the ABS 304 invokes the AVS 310 to check if the address is a correct existing address, and, if so, normalize the address for use by the LPS 308.

The AMS 316 manages the relationship between physical locations (e.g., physical location identifiers) and user accounts. In addition, the AMS 316 also manages the searchable attributes for an address in the account address database 318. In one example embodiment, the AMS 316 is configured to access the account address database 318, and the other services have to interface with the AMS 316 to obtain information from the account address database 318.

The account address database 318 stores an account address table 320, which includes information mapping a user account to a physical location identifier. In one example embodiment, the account address table 320 includes an account address identifier, an account identifier associated with the user of the network service, a physical location ID (which points to the corresponding entry in the physical location table 324), an address type (e.g., residence, shipping, or billing), a contact name, etc. More details for the account address table 320 are provided below with reference to FIG. 4.

When the ABS 304 gets from a user the actual physical address, also referred to herein as the physical location, the ABS 304 communicates with the LPS 308 to store the physical location in the physical location database 312. The LPS 308 returns a physical location identifier, also referred to herein as a reference identifier, and the ABS 304 interfaces with the AMS 316 to store, in the account address database 318, the mapping of the physical location identifier to the account address of the user.

A secure area, called a user authentication zone (AUZ) 322, is defined within the electronic commerce system 314 to protect user information. The AUZ 322 includes the AMS 316, the account address database 318, and the firewall 306. The firewall 306 is at the edge of the AUZ 322 and controls communications from and to the AMS 316. In one example embodiment, it is not possible to access the AMS 316 and the account address database 318 from outside the AUZ 322 without going through the firewall 306.

In one example embodiment, the firewall 306 includes a filtering rule that allows communications to the AMS 316 from the ABS 304. Therefore, other services that want information from the account address table 320 interface with the ABS 304 to obtain this information. In another example embodiment, the firewall 306 includes another rule to limit data requests to the AMS 316 to be of a maximum predefined threshold size in order to avoid downloads of large portions of the account address table 320.

In one example embodiment, service requests to the AMS 316 are encrypted and utilize security certificates to validate the sender and the receiver in the communications exchange.

It is to be noted that the embodiments illustrated in FIG. 3 are examples and do not describe every possible embodiment. Each of the services may be implemented in one server, or distributed across a plurality of servers. In addition, more than one service may be hosted in the same server. Further, the connections between the different services may be network connections or maybe logical connections between services hosted in the same server. The firewall 306 may be a network firewall that controls the network traffic to the AMS 316. In other example embodiments, the firewall 306 is implemented within a computing device when the AMS is co-hosted with one or more services within the same server.

In another example embodiment, the firewall 306 is placed in a network and all communications to the AMS 316 go through the firewall 306, even if other services are co-hosted within the same server as the AMS 316. The physical location database 312 and the account address database 318 may reside in any type of computer memory, such as a dedicated database, an external disk drive, or any other type of permanent memory. The embodiments illustrated in FIG. 3 should therefore not be interpreted to be exclusive or limiting, but rather illustrative.

Figure 4:
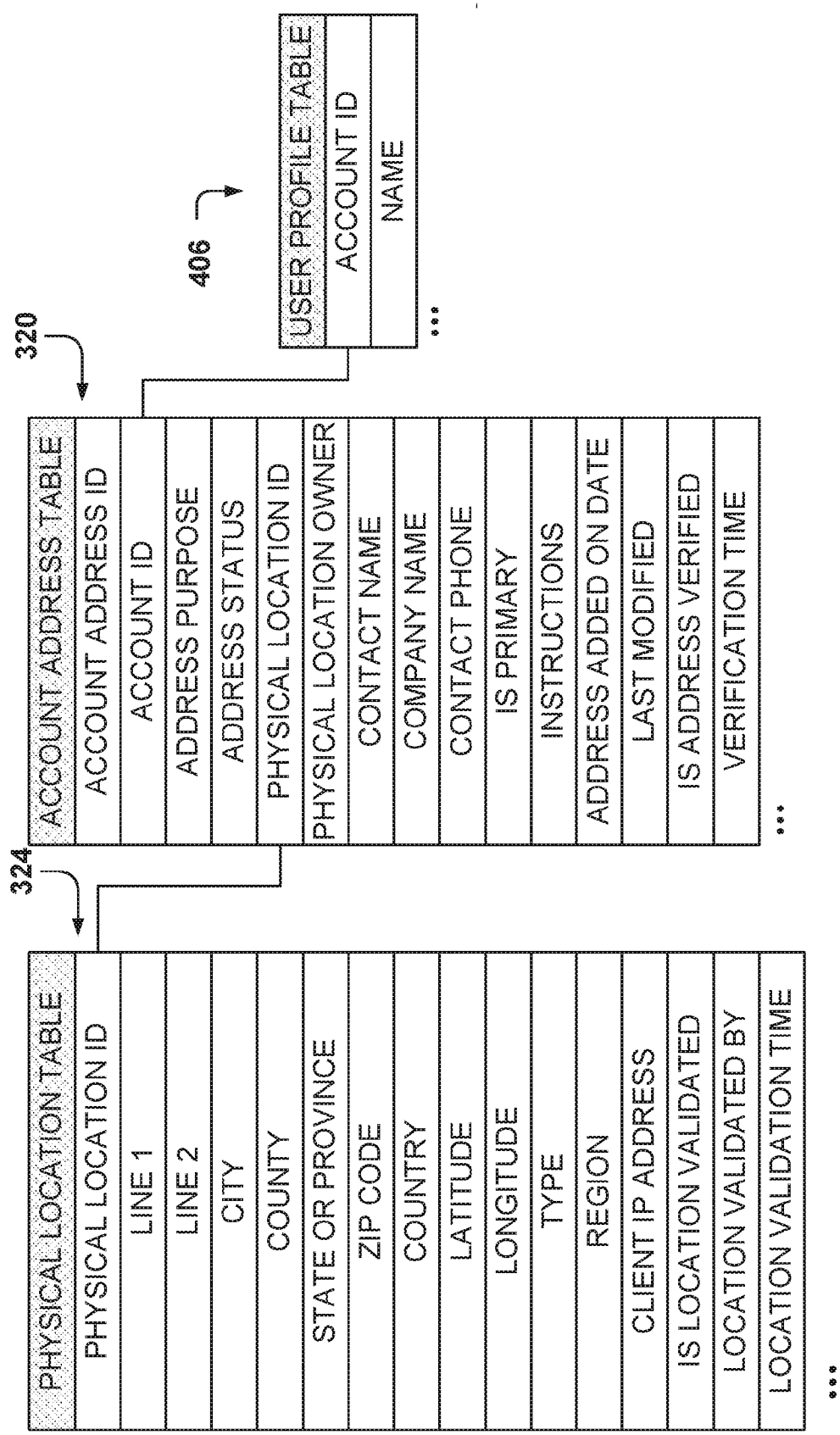
FIG. 4 illustrates separate data structures, according to some example embodiments, for keeping physical location information and user-address information.

FIG. 4 illustrates separate data structures for keeping physical location information and user-address information, according to some example embodiments. In one example embodiment, the physical location table 324 includes one or more of the following fields:

- a physical location identifier, which is a unique ID associated with the entry in the physical location table 324. This physical location identifier is stored in the account address table 320 to identify the corresponding address for the user;
- a first line of a street address;
- a second line of the street address;
- a city;
- a county;
- a state or province for the address;
- a ZIP code;
- a country;
- a latitude and longitude for the address;
- a type of address;
- a region;
- an Internet Protocol (IP) address associated with the physical location;
- a flag indicating if the physical location has been validated;
- an identifier of the entity that validated the physical location;
- a time when the physical location was validated, if available;
- etc.

The account address table 320 is used to store information about a particular user and includes a pointer to the physical location table 324 to match the user to an address. In some example embodiments, there may be several pointers to the physical location table 324 if the user is associated with several addresses, such as residence, work, delivery, billing, or any other address.

In one example embodiment, the account address table 404 includes one or more of the following fields:

- an account address identifier, which uniquely identifies the entry within the account address table 320;
- an account identifier, which uniquely identifies the user of the network service. In some example embodiments, the account identifier is linked to other databases, such as a user profile table 406 that holds profile information for the user;
- an address purpose (e.g., shopping, billing, credit card);
- an address status (e.g., active or inactive);
- a physical location identifier that is used to link the user to the entry that holds the physical location information in the physical location table 324;
- a physical location owner;
- a contact name;
- a company name;
- a contact phone number;
- a flag indicating if the address is the primary address for the account;
- instructions for delivery;
- a date when the address was added;
- a date and time when the address was last modified;
- a flag indicating if the address has been verified;
- a time indicating when the verification took place (if available);
- etc.

The user profile table 406 holds information about the user and includes, at least, an account identifier, a name of the user or entity, etc.

It is to be noted that the embodiments illustrated in FIG. 4 are examples and do not describe every possible embodiment. Other embodiments may utilize different fields, include additional fields or fewer fields, include other tables, etc. The embodiments illustrated in FIG. 4 should therefore not be interpreted to be exclusive or limiting, but rather illustrative.

By using the physical location table 324 and the account address table 320, the PII is separated from the non-PII; that is, the user information is separated from the address information.

Additionally, by creating a physical location identifier for each address, it is possible to detect users that have the same address. This information may be helpful in determining, for example, if the address is a home address or a business address. In addition, it would be easy to add additional information associated with the address, which does not have to be repeated multiple times.

Further yet, because the address information is kept outside the firewall 306, the address information does not have to travel through the firewall 306, reducing the amount of data transferred through the firewall 306.

In summary, there are at least three different benefits resulting from keeping the tables separate. First, the amount of storage required is reduced because of the elimination of duplicate address information. Second, it is easier to secure the link between the user and the address information. Third, the amount of data that travels through the firewall is reduced.

Figure 5:
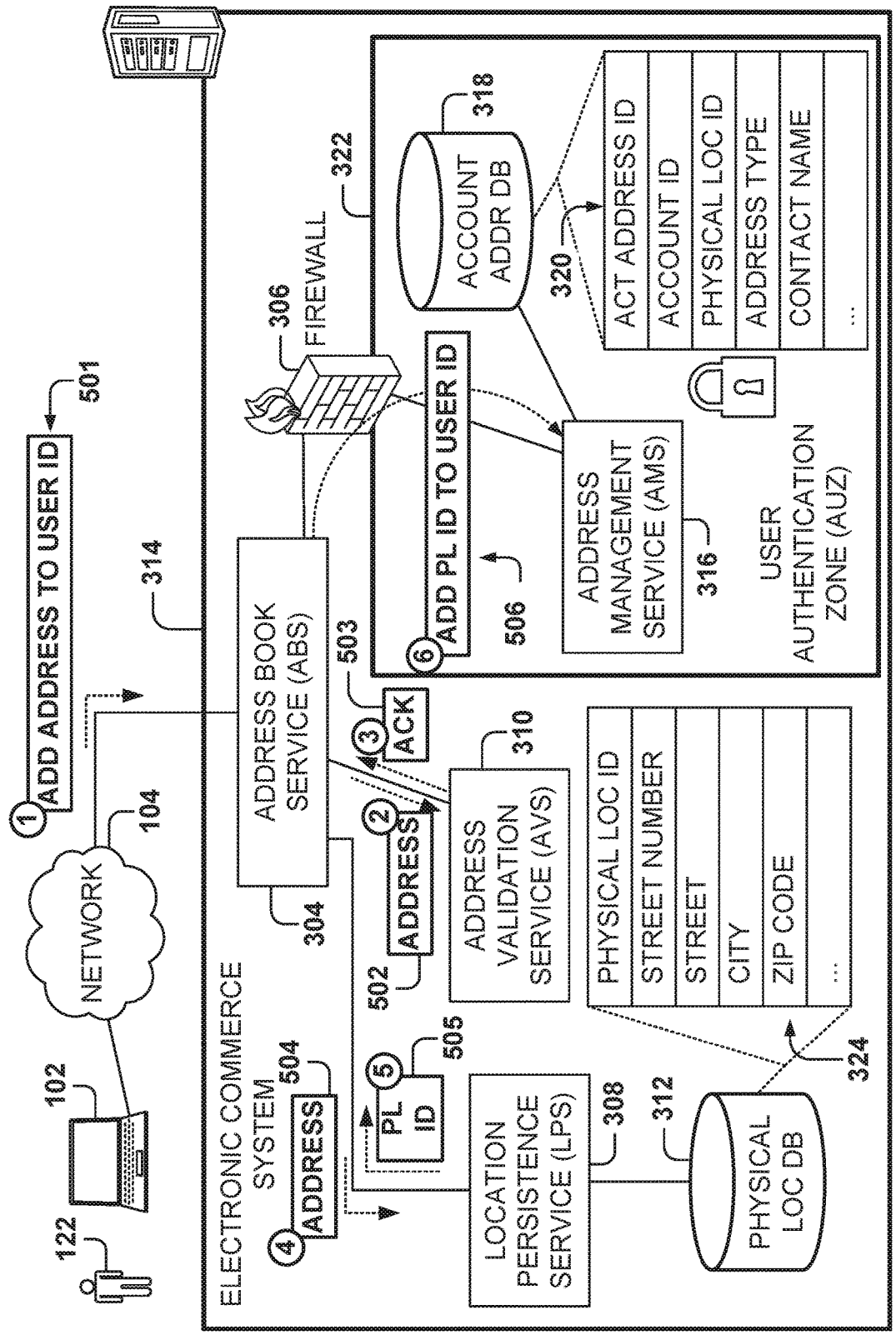
FIG. 5 illustrates a method for adding a new user address, according to some example embodiments.

FIG. 5 illustrates a method for adding a new user address, according to some example embodiments. To add a new address, the user 122 enters the address via the client device 102, and a request to add the address for the corresponding user ID is sent 501 to the ABS 304. In one example embodiment, the user 122 is authenticated and the request is validated with the user credential.

The ABS 304 sends 502 the address to the AVS 310 to check that the address is a valid address. If necessary, the AVS 310 also normalizes the address to place the address in a standard format in order to avoid duplicate addresses in the database with slight variations (e.g., "Dr." vs "Drive").

The AVS 310 sends 503 an acknowledgement to the ABS 304 stating whether the address is correct and information about the corresponding normalized address, if necessary.

After the address has been validated, the ABS sends 504 the address to the LPS 308 to request a physical location identifier for the address. The LPS 308 checks if the address already exists in the physical location table 324. If the address already exists, the LPS 308 returns 505 the physical location identifier of the address to the ABS 304. If the address does not already exist in the physical location table 324, the LPS 308 adds a new entry for the new address and sends the physical location identifier of the new entry to the ABS 304.

After the ABS 304 receives the physical location identifier, the ABS 304 sends 506 the physical location identifier and the user ID to the AMS 316 (through the firewall 306). The AMS 316 then adds a new entry in the account address table 320 (assuming that the entry does not already exist), where the new entry includes the account identifier of the user 122 that sent the request and the received physical location identifier.

For editing the address of the user, a similar procedure is performed, except that instead of adding a new entry to the account address table 320, the existing entry is modified with the new physical location identifier for the new address.

Figure 6:
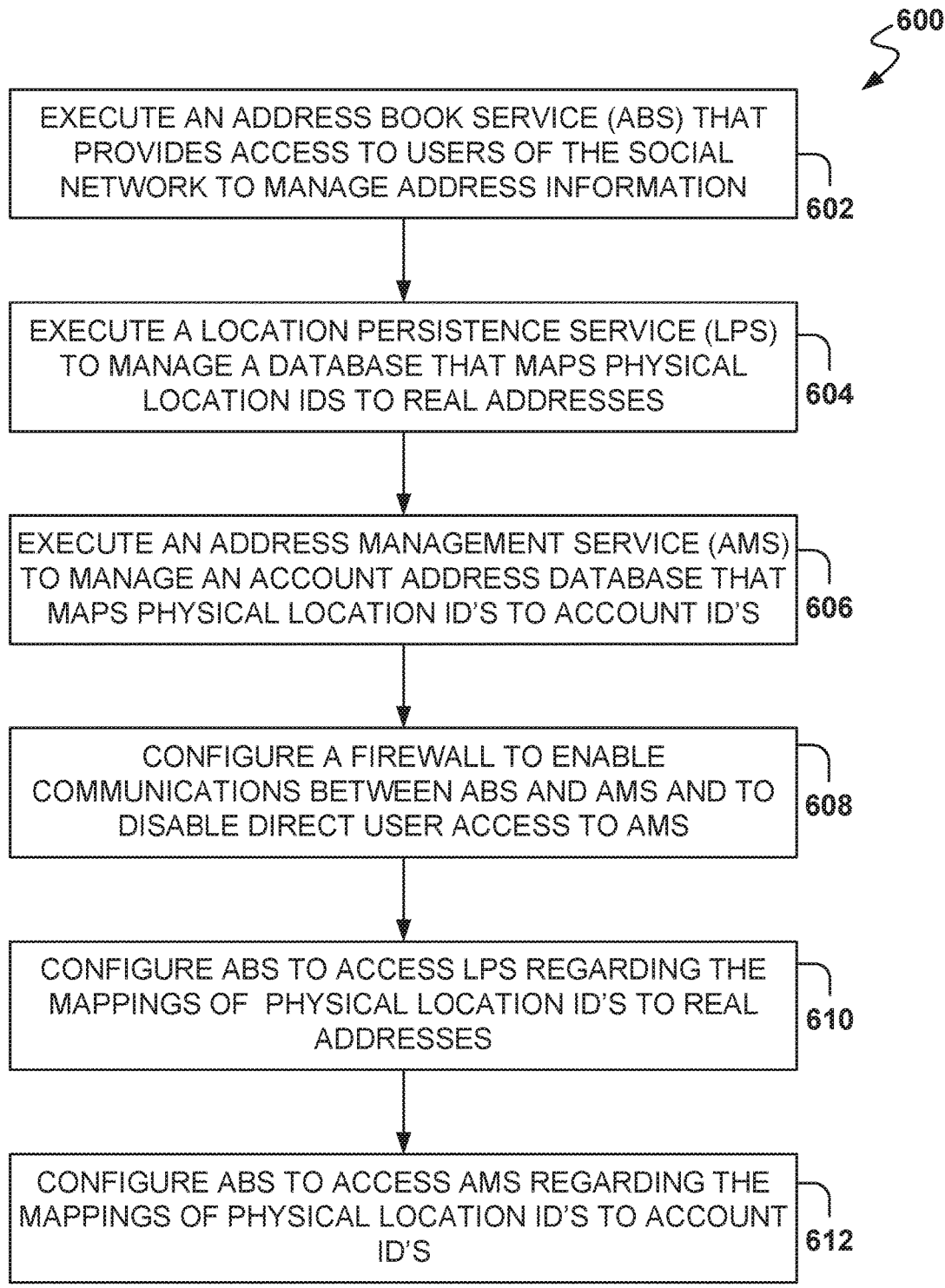
FIG. 6 is a flowchart of a method for implementing multiple services related to user-address management, according to some example embodiments.

FIG. 6 is a flowchart of a method 600 for implementing multiple services related to user-address management, according to some example embodiments. While the various operations in this flowchart are presented and described sequentially, one of ordinary skill will appreciate that some or all of the operations may be executed in a different order, be combined or omitted, or be executed in parallel.

At operation 602, the ABS is executed in a computing device. The ABS provides access to users of the social network to allow the users to manage their address information. The ABS also provides interfaces to other services to manage user-address information.

From operation 602, the method 600 flows to operation 604, where the LPS is executed in a computing device. The LPS manages a database that maps physical location identifiers to real addresses. From operation 604, the method 600 flows to operation 606, where the AMS is executed in a computing device. The AMS manages an account address database that maps physical location identifiers to account identifiers.

At operation 608, a firewall (e.g., firewall 306 in FIG. 3) is configured to enable communications between the ABS and the AMS, while disabling direct access to the AMS by users and other services. Therefore, in one example embodiment, the ABS is the only service configured to send requests through the firewall.

At operation 610, the ABS is configured to access the LPS regarding mappings of physical location identifiers to real addresses. From operation 610, the method 600 flows to operation 612, where the ABS is configured to access the AMS regarding the mappings of physical location identifiers to account identifiers.

Figure 7:
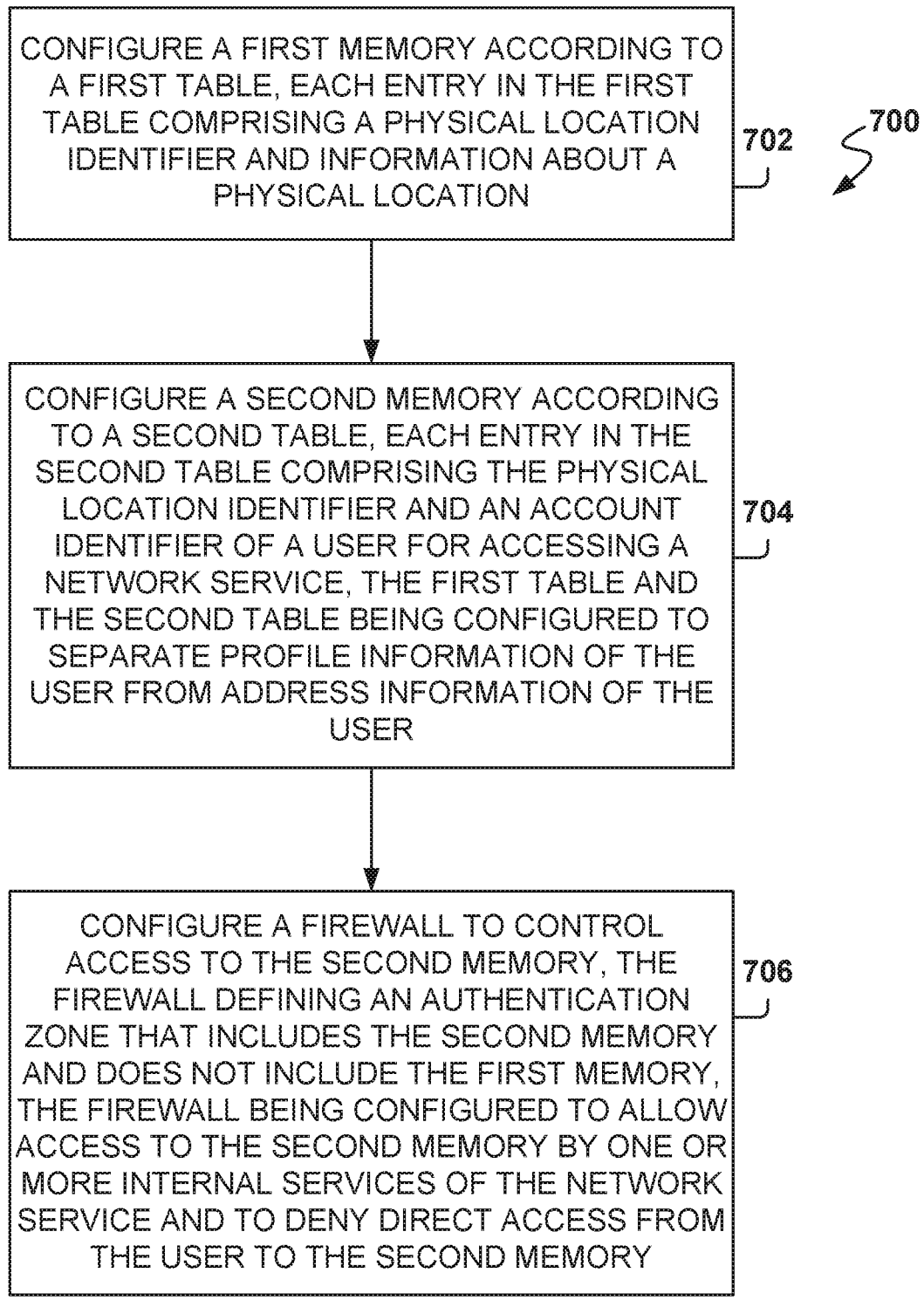
FIG. 7 is a flowchart of a method, according to some example embodiments, for securing user-address information.

FIG. 7 is a flowchart of a method 700, according to some example embodiments, for securing user-address information. While the various operations in this flowchart are presented and described sequentially, one of ordinary skill will appreciate that some or all of the operations may be executed in a different order, be combined or omitted, or be executed in parallel.

Operation 702 is for configuring, by one or more processors, a first memory according to a first table (e.g., physical location table 324 in FIG. 3). Each entry in the first table includes a physical location identifier and information about a physical location.

From operation 702, the method 700 flows to operation 704, where a second memory is configured by the one or more processors according to a second table (e.g., account address table 320 in FIG. 3). Each entry in the second table includes the physical location identifier and an account identifier of a user for accessing a network service. Further, the first table and the second table are configured to separate profile information of the user from address information of the user.

From operation 704, the method 700 flows to operation 706 for configuring, by the one or more processors, a firewall to control access to the second memory. The firewall defines an authentication zone (e.g., AUZ 322 in FIG. 3) that includes the second memory and does not include the first memory. Additionally, the firewall is configured to allow access to the second memory by one or more internal services of the network service and the firewall is also configured to deny direct access by the user to the second memory.

Implementations may include one or more of the following features. The method 700 as recited where an address management service (AMS) module inside the authentication zone is connected to the firewall and to the second memory, where the AMS manages requests to access or modify the second table.

The method 700 as recited where an address book service (ABS) module outside the authentication zone is connected to the firewall, the ABS managing user requests that require access to the first table or the second table. In one example embodiment, a location persistence service (LPS) outside the authentication zone manages requests to access or modify the first table, where the ABS is configured to send a request to the LPS to map a given physical location to a corresponding physical location identifier, and the ABS is configured to provide the physical location identifier to the AMS to map the physical location identifier to the user.

The method 700 as recited where the firewall is configured to allow access from the ABS to the AMS. In another example embodiment, an address validation service (AVS) module outside the authentication zone validates addresses entered by users of the network service. In yet another example embodiment, the information about a physical location in the first table includes one or more of a street address, a city, a state or province, a zip code, a country, a latitude, and a longitude. In one example embodiment, the second table further includes one or more of an account address identifier, an address purpose, an address status, a contact name, a contact phone number, and delivery instructions.

The method 700 as recited where the first table does not include user information. In another example embodiment, the method 700 further includes an operation for configuring, by the one or more processors, a third memory according to a third table, each entry in the third table including the account identifier and user profile information.

Figure 8:
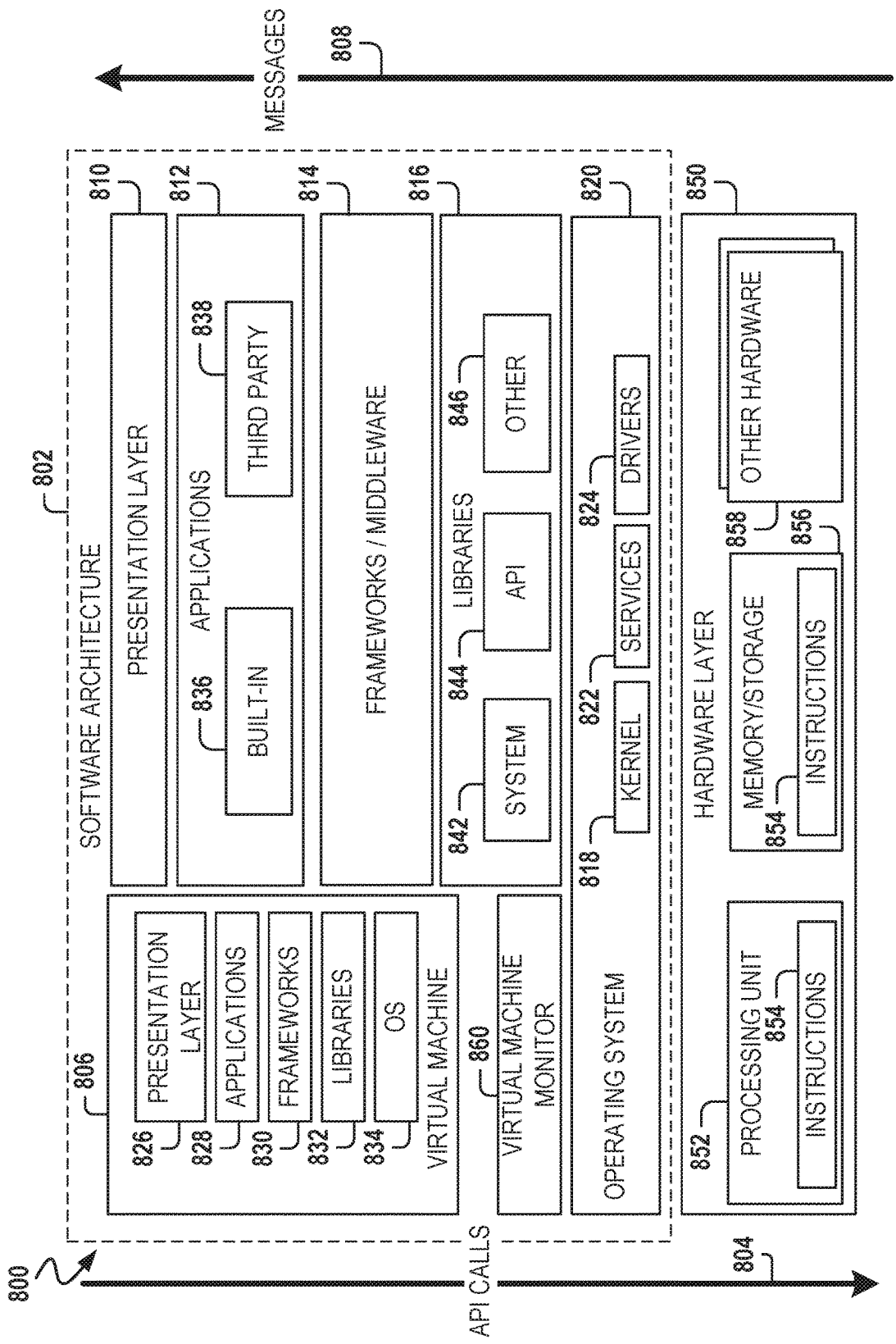
FIG. 8 is a block diagram illustrating an example of a software architecture that may be installed on a machine, according to some example embodiments.

FIG. 8 is a block diagram 800 illustrating a representative software architecture 802, which may be used in conjunction with various hardware architectures herein described. FIG. 8 is merely a non-limiting example of a software architecture 802 and it will be appreciated that many other architectures may be implemented to facilitate the functionality described herein. The software architecture 802 may be executing on hardware such as a machine 900 of FIG. 9 that includes, among other things, processors 904, memory/storage 906, and input/output (I/O) components 918. A representative hardware layer 850 is illustrated and can represent, for example, the machine 900 of FIG. 9. The representative hardware layer 850 comprises one or more processing units 852 having associated executable instructions 854. The executable instructions 854 represent the executable instructions of the software architecture 802, including implementation of the methods, modules, and so forth of FIGS. 1-7. The hardware layer 850 also includes memory and/or storage modules 856, which also have the executable instructions 854. The hardware layer 850 may also comprise other hardware 858 which represents any other hardware of the hardware layer 850, such as the other hardware illustrated as part of the machine 900.

In the example architecture of FIG. 8, the software architecture 802 may be conceptualized as a stack of layers where each layer provides particular functionality. For example, the software architecture 802 may include layers such as an operating system 820, libraries 816, frameworks/middleware 814, applications 812, and a presentation layer 810. Operationally, the applications 812 and/or other components within the layers may invoke API calls 804 through the software stack and receive a response, returned values, and so forth illustrated as messages 808 in response to the API calls 804. The layers illustrated are representative in nature and not all software architectures have all layers. For example, some mobile or special purpose operating systems may not provide a frameworks/middleware layer 814, while others may provide such a layer. Other software architectures may include additional or different layers.

The operating system 820 may manage hardware resources and provide common services. The operating system 820 may include, for example, a kernel 818, services 822, and drivers 824. The kernel 818 may act as an abstraction layer between the hardware and the other software layers. For example, the kernel 818 may be responsible for memory management, processor management (e.g., scheduling), component management, networking, security settings, and so on. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 812 and/or other components and/or layers. The libraries 816 typically provide functionality that allows other software modules to perform tasks in an easier fashion than to interface directly with the underlying operating system 820 functionality (e.g., kernel 818, services 822, and/or drivers 824). The libraries 816 may include system libraries 842 (e.g., C standard library) that may provide functions such as memory allocation functions, string manipulation functions, mathematic functions, and the like. In addition, the libraries 816 may include API libraries 844 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 816 may also include a wide variety of other libraries 846 to provide many other APIs to the applications 812 and other software components/modules.

The frameworks 814 (also sometimes referred to as middleware) may provide a higher-level common infrastructure that may be utilized by the applications 812 and/or other software components/modules. For example, the frameworks 814 may provide various graphic user interface (GUI) functions, high-level resource management, high-level location services, and so forth. The frameworks 814 may provide a broad spectrum of other APIs that may be utilized by the applications 812 and/or other software components/modules, some of which may be specific to a particular operating system or platform.

The applications 812 include built-in applications 836 and/or third-party applications 838. Examples of representative built-in applications 836 may include, but are not limited to, a contacts application, a browser application, a book reader application, a location application, a media application, a messaging application, and/or a game application. The third-party applications 838 may include any of the built-in applications 836 as well as a broad assortment of other applications. In a specific example, the third-party application 838 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 838 may invoke the API calls 804 provided by the mobile operating system such as the operating system 820 to facilitate functionality described herein.

The applications 812 may utilize built-in operating system functions (e.g., kernel 818, services 822, and/or drivers 824), libraries (e.g., system libraries 842, API libraries 844, and other libraries 846), or frameworks/middleware 814 to create user interfaces to interact with users of the system. Alternatively, or additionally, in some systems, interactions with a user may occur through a presentation layer, such as the presentation layer 810. In these systems, the application/module "logic" can be separated from the aspects of the application/module that interact with a user.

Some software architectures utilize virtual machines. In the example of FIG. 8, this is illustrated by a virtual machine 806. A virtual machine creates a software environment where applications/modules can execute as if they were executing on a hardware machine (such as the machine 900 of FIG. 9, for example). The virtual machine 806 is hosted by a host operating system (e.g., operating system 820 in FIG. 8) and typically, although not always, has a virtual machine monitor 860, which manages the operation of the virtual machine 806 as well as the interface with the host operating system (e.g., operating system 820). A software architecture executes within the virtual machine 806 such as an operating system 834, libraries 832, frameworks/middleware 830, applications 828, and/or a presentation layer 826. These layers of software architecture executing within the virtual machine 806 can be the same as corresponding layers previously described or may be different.

Figure 9:
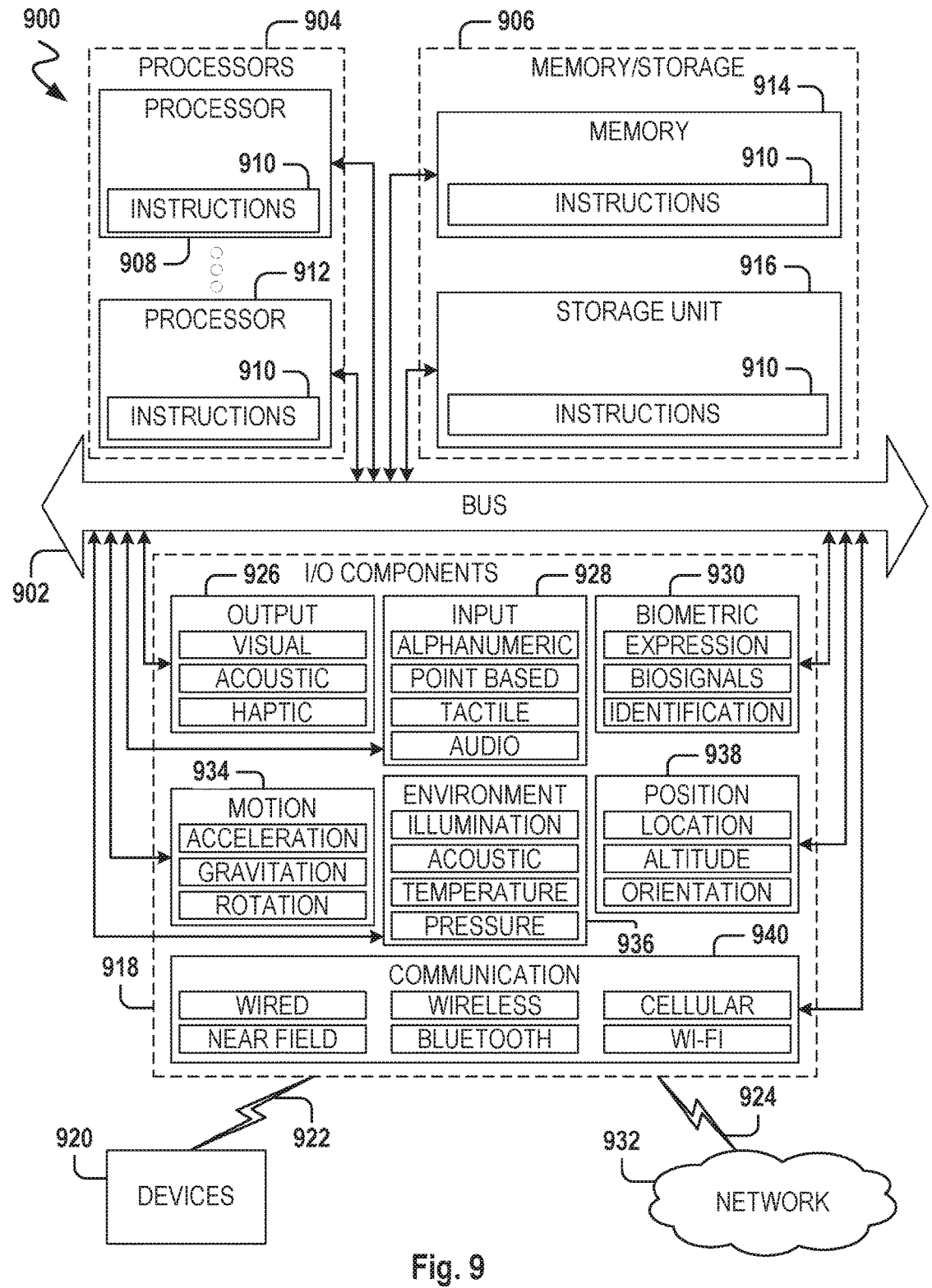
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. For example, the instructions 910 may cause the machine 900 to execute the flow diagrams of FIGS. 6-7. Additionally, or alternatively, the instructions 910 may implement the ABS 304, LPS 308, AVS 310, and AMS 316 of FIGS. 3 and 5, and so forth. The instructions 910 transform the general, non-programmed machine 900 into a particular machine 900 programmed to carry out the described and illustrated functions in the manner described.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines 900 that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that may execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single core, a single processor with multiple cores (e.g., a multi-core processor), multiple processors with a single core, multiple processors with multiples cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of the processors 904 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 910. The term "machine-readable medium" shall also be taken to include any medium, or combination of multiple media, that is capable of storing instructions (e.g., instructions 910) for execution by a machine (e.g., machine 900), such that the instructions, when executed by one or more processors of the machine (e.g., processors 904), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 918 may include a wide variety of components to receive input, provide output, produce output, transmit information, exchange information, capture measurements, and so on. The specific I/O components 918 that are included in a particular machine will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion, and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via a coupling 924 and a coupling 922, respectively. For example, the communication components 940 may include a network interface component or other suitable device to interface with the network 932. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting an NFC beacon signal that may indicate a particular location, and so forth.

In various example embodiments, one or more portions of the network 932 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 932 or a portion of the network 932 may include a wireless or cellular network and the coupling 924 may be a Code Division Multiple Access (CDMA) connection, a Global System for Mobile communications (GSM) connection, or another type of cellular or wireless coupling. In this example, the coupling 924 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 910 may be transmitted or received over the network 932 using a transmission medium via a network interface device (e.g., a network interface component included in the communication components 940) and utilizing any one of a number of well-known transfer protocols (e.g., hypertext transfer protocol (HTTP)). Similarly, the instructions 910 may be transmitted or received using a transmission medium via the coupling 922 (e.g., a peer-to-peer coupling) to the devices 920. The term "transmission medium" shall be taken to include any intangible medium that is capable of storing, encoding, or carrying the instructions 910 for execution by the machine 900, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    configuring, by one or more processors, a first memory according to a first table, each entry in the first table comprising a physical location identifier and information about a physical location;
    configuring, by the one or more processors, a second memory according to a second table, each entry in the second table comprising the physical location identifier and an account identifier of a user for accessing a network service, the first table and the second table being configured to separate profile information of the user from address information of the user; and configuring, by the one or more processors, a firewall to control access to the second memory, the firewall defining an authentication zone that includes the second memory and does not include the first memory, the firewall being configured to allow access to the second memory by one or more internal services of the network service and to deny direct access by the user to the second memory.

2. The method as recited in claim 1, wherein an address management service (AMS) module inside the authentication zone is connected to the firewall and to the second memory, wherein the AMS manages requests to access or modify the second table.

3. The method as recited in claim 2, wherein an address book service (ABS) module outside the authentication zone is connected to the firewall, the ABS managing user requests that require access to the first table or the second table.

4. The method as recited in claim 3, wherein a location persistence service (LPS) outside the authentication zone manages requests to access or modify the first table, wherein the ABS is configured to send a request to the LPS to map a given physical location to a corresponding physical location identifier, wherein the ABS is configured to provide the corresponding physical location identifier to the AVIS to map the physical location identifier to the user.

5. The method as recited in claim 3, wherein the firewall is configured to allow access from the ABS to the AMS.

6. The method as recited in claim 1, wherein an address validation service (AVS) module outside the authentication zone validates addresses entered by users of the network service.

7. The method as recited in claim 1, wherein the information about a physical location in the first table comprises one or more of a street address, a city, a state or province, a zip code, a country, a latitude, and a longitude.

8. The method as recited in claim 1, wherein the second table further comprises one or more of an account address identifier, an address purpose, an address status, a contact name, a contact phone number, and delivery instructions.

9. The method as recited in claim 1, wherein the first table does not include user information.

10. The method as recited in claim 1, further comprising:
configuring, by the one or more processors, a third memory according to a third table, each entry in the third table comprising the account identifier and user profile information.

11. A system comprising:
a memory comprising instructions; and
one or more computer processors, wherein the instructions, when executed by the one or more computer processors, cause the one or more computer processors to perform operations comprising:
configuring a first memory according to a first table, each entry the first table comprising a physical location identifier and information about a physical location;
configuring a second memory according to a second table, each entry in the second table comprising the physical location identifier and an account identifier of a user for accessing a network service, the first table and the second table being configured to separate profile information of the user from address information of the user; and
configuring a firewall to control access to the second memory, the firewall defining an authentication zone that includes the second memory and does not include the first memory, the firewall being configured to allow access to the second memory by one or more internal services of the network service and to deny direct access by the user to the second memory.

12. The system as recited in claim 11, wherein an address management service (AMS) module inside the authentication zone is connected to the firewall and to the second memory, wherein the AMS manages requests to access or modify the second table, wherein an address book service (ABS) module outside the authentication zone is connected to the firewall, the ABS managing user requests that require access to the first table or the second table.

13. The system as recited in claim 12, wherein a location persistence service (LPS) outside the authentication zone manages requests to access or modify the first table, wherein the ABS is configured to send a request to the LPS to map a given physical location to a corresponding physical location identifier, wherein the ABS is configured to provide the corresponding physical location identifier to the AMS to map the physical location identifier to the user.

14. The system as recited in claim 12, wherein the firewall is configured to allow access from the ABS to the AMS.

15. The system as recited in claim 11, wherein the second table further comprises one or more of an account address identifier, an address purpose, an address status, a contact name, a contact phone number, and delivery instructions.

16. A non-transitory machine-readable storage medium including instructions that, when executed by a machine, cause the machine to perform operations comprising:
configuring, by one or more processors, a first memory according to a first table, each entry in the first table comprising a physical location identifier and information about a physical location;
configuring, by the one or more processors, a second memory according to a second table, each entry in the second table comprising the physical location identifier and an account identifier of a user for accessing a network service, the first table and the second table being configured to separate profile information of the user from address information of the user; and
configuring, by the one or more processors, a firewall to control access to the second memory, the firewall defining an authentication zone that includes the second memory and does not include the first memory, the firewall being configured to allow access to the second memory by one or more internal services of the network service and to deny direct access by the user to the second memory.

17. The machine-readable storage medium as recited in claim 16, wherein an address management service (AMS) module inside the authentication zone is connected to the firewall and to the second memory, wherein the AMS manages requests to access or modify the second table, wherein an address book service (ABS) module outside the authentication zone is connected to the firewall, the ABS managing user requests that require access to the first table or the second table.

18. The machine-readable storage medium as recited in claim 17, wherein a location persistence service (LPS) outside the authentication zone manages requests to access or modify the first table, wherein the ABS is configured to send a request to the LPS to map a given physical location to a corresponding physical location identifier, wherein the ABS is configured to provide the corresponding physical location identifier to the AMS to map the physical location identifier to the user.

19. The machine-readable storage medium as recited in claim 16, wherein an address validation service (AVS) module outside the authentication zone validates addresses entered by users of the network service.

20. The machine-readable storage medium as recited in claim 16, wherein the information about a physical location in the first table comprises one or more of a street address, a city, a state or province, a zip code, a country, a latitude, and a longitude, wherein the second table further comprises one or more of an account address identifier, an address purpose, an address status, a contact name, a contact phone number, and delivery instructions.

* * * * *

UNITED STATES PATENT AND TRADEMARK OFFICE
CERTIFICATE OF CORRECTION

PATENT NO. : 10,043,031 B2
APPLICATION NO. : 15/345808
DATED : August 7, 2018
INVENTOR(S) : Snezana Sahter et al.

It is certified that error appears in the above-identified patent and that said Letters Patent is hereby corrected as shown below:

In the Claims

In Column 17, Line 28, in Claim 4, delete "AVIS" and insert -- AMS --, therefor.

In Column 17, Line 58, in Claim 11, delete "entry" and insert -- entry in --, therefor.

Signed and Sealed this
Ninth Day of October, 2018

Andrei Iancu
*Director of the United States Patent and Trademark Office*